US010099186B2

(12) United States Patent
Dunnebier et al.

(10) Patent No.: US 10,099,186 B2
(45) Date of Patent: Oct. 16, 2018

(54) METHOD AND DEVICE FOR COATING OR MIXING GRANULAR PRODUCTS, MORE IN PARTICULAR PEANUTS, WITH A SUBSTANCE

(71) Applicant: INTERSNACK GROUP GMBH & CO. KG, Düsseldorf (DE)

(72) Inventors: Michel Dunnebier, Zutphen (NL); Hermanus Theodorus Wilhelmus Zweers, Kilder (NL)

(73) Assignee: INTERSNACK GROUP GMBH & CO. KG, Dusseldorf (DE)

( * ) Notice: Subject to any disclaimer, the term of this patent is extended or adjusted under 35 U.S.C. 154(b) by 453 days.

(21) Appl. No.: 14/825,182

(22) Filed: Aug. 13, 2015

(65) Prior Publication Data

US 2016/0044954 A1 Feb. 18, 2016

(30) Foreign Application Priority Data

Aug. 13, 2014 (EP) ..................... 14180859

(51) Int. Cl.
*A23G 3/26* (2006.01)
*A23G 3/34* (2006.01)
(Continued)

(52) U.S. Cl.
CPC ............... *B01F 7/165* (2013.01); *A23B 9/14* (2013.01); *A23G 3/0095* (2013.01); *A23G 3/26* (2013.01);
(Continued)

(58) Field of Classification Search
CPC .......... A23B 9/14; A23G 3/0095; A23G 3/26; A23P 20/13; A23P 20/18; B01F 15/00922;
(Continued)

(56) References Cited

U.S. PATENT DOCUMENTS 1,239,221 A * 9/1917 Rodman ................. A23G 3/26
118/303
1,772,640 A * 8/1930 Smith ..................... B01F 7/165
366/314

(Continued)

FOREIGN PATENT DOCUMENTS

DE 4411058 10/1995
DE 19750042 12/1998

OTHER PUBLICATIONS

Espacenet, family dossiers, Family list of EP2992766 (A1)—Mar. 9, 2016, printed on Jun. 6, 2018, 2 pages.*

(Continued)

*Primary Examiner* — Tony G Soohoo
(74) *Attorney, Agent, or Firm* — JCIPRNET

(57) ABSTRACT

The present invention relates to a device for coating and mixing granular products, in particular food products, more in particular peanuts, the device comprising a compartment defined by a rotary bottom part and a stationary circumferential side wall, the device further comprising: a product supply for supplying the products into the compartment, a substance supply for supplying a substance into the compartment, a drive for rotating the rotary bottom part about its substantially vertical axis, wherein the rotary bottom part and the stationary circumferential side wall comprise non-stick parts which define a substantial part of an inner surface of the compartment and which are manufactured from a non-stick material, wherein said non-stick parts are mechanically connected to the device via detachable connectors, allowing fast replacement of worn-out non-stick parts by new, same non-stick parts.

26 Claims, 13 Drawing Sheets

(51) Int. Cl.
*A23P 20/13* (2016.01)
*A23P 20/18* (2016.01)
*A23B 9/14* (2006.01)
*B05C 3/08* (2006.01)
*B01F 7/16* (2006.01)
*B01F 15/00* (2006.01)

(52) U.S. Cl.
CPC .............. *A23P 20/13* (2016.08); *A23P 20/18* (2016.08); *B01F 7/1675* (2013.01); *B01F 15/00038* (2013.01); *B01F 15/00058* (2013.01); *B01F 15/00844* (2013.01); *B01F 15/00922* (2013.01); *B05C 3/08* (2013.01); *B01F 15/00733* (2013.01)

(58) Field of Classification Search
CPC .............. B01F 7/165; B01F 15/00058; B01F 15/00733; B01F 15/00844; B01F 15/00038; B05C 3/08
See application file for complete search history.

(56) References Cited

U.S. PATENT DOCUMENTS

| | | | | |
|---|---|---|---|---|
| 1,879,828 A * | 9/1932 | Smith | B01F 7/165 | 366/194 |
| 3,030,657 A * | 4/1962 | Von Reppert | B01J 2/14 | 23/313 P |
| 3,160,400 A * | 12/1964 | Harrison | B01F 7/165 | 366/65 |
| 3,201,095 A * | 8/1965 | Erwien | A47J 43/046 | 366/314 |
| 3,345,683 A * | 10/1967 | Eirich | B01J 2/14 | 209/361 |
| RE27,214 E * | 11/1971 | Nakahara | B01J 2/14 | 264/117 |
| 3,671,296 A * | 6/1972 | Funakoshi | A61J 3/005 | 118/500 |
| 3,863,904 A * | 2/1975 | Milik | B01F 7/162 | 366/184 |
| 3,920,228 A * | 11/1975 | Klauk | A47J 27/14 | 366/313 |
| 3,938,787 A * | 2/1976 | Bobylev | B01F 9/125 | 366/196 |
| 4,034,126 A * | 7/1977 | Funakoshi | A61K 9/5089 | 118/664 |
| 4,101,978 A * | 7/1978 | Brackman | B01F 7/162 | 366/185 |
| 4,214,863 A * | 7/1980 | Nixon | C03B 1/02 | 425/222 |
| 4,357,111 A * | 11/1982 | Honemeyer | B01F 7/16 | 241/282.1 |
| 4,460,277 A * | 7/1984 | Schulz | B29B 7/7461 | 241/101.2 |
| 4,494,971 A * | 1/1985 | Monteyne | C21B 3/08 | 65/141 |
| 4,542,043 A * | 9/1985 | Abe | B01J 2/006 | 118/303 |
| 4,623,098 A * | 11/1986 | Motoyama | B01J 2/10 | 241/46.04 |
| RE32,307 E * | 12/1986 | Glatt | B01J 2/16 | 34/369 |
| 4,636,163 A * | 1/1987 | Appelgren | B01J 2/14 | 425/332 |
| 4,724,794 A * | 2/1988 | Itoh | B01J 2/003 | 118/19 |
| 4,726,755 A * | 2/1988 | Holley | B01J 2/14 | 425/222 |
| 4,740,390 A * | 4/1988 | Kulling | B01J 2/14 | 118/303 |
| 4,826,325 A * | 5/1989 | Iwata | B01F 7/1675 | 366/221 |
| 4,834,299 A * | 5/1989 | Kishibata | B01J 2/16 | 241/39 |
| 4,895,733 A * | 1/1990 | Imanidis | B01J 2/14 | 118/303 |
| 4,967,688 A * | 11/1990 | Funakoshi | B01J 2/16 | 118/303 |
| 5,011,640 A * | 4/1991 | Zanchetta | A61J 3/005 | 23/313 R |
| 5,132,142 A * | 7/1992 | Jones | B01J 2/006 | 118/24 |
| 5,296,265 A * | 3/1994 | Okuma | B01J 2/006 | 118/303 |
| 5,350,567 A * | 9/1994 | Takeda | B01J 2/14 | 118/665 |
| 5,393,139 A * | 2/1995 | Thorson | B01F 7/165 | 366/286 |
| 5,403,395 A | 4/1995 | McCullough et al. | | |
| 5,507,871 A * | 4/1996 | Morino | B01J 2/003 | 118/52 |
| 5,582,643 A * | 12/1996 | Takei | A23P 20/18 | 118/19 |
| 5,720,439 A * | 2/1998 | Nakazawa | B01J 2/14 | 241/21 |
| 5,904,951 A * | 5/1999 | Yamanaka | A23G 3/26 | 118/19 |
| 6,030,565 A * | 2/2000 | Golan | B01J 2/00 | 264/117 |
| 6,264,989 B1 * | 7/2001 | Kato | A61K 9/1688 | 424/439 |
| 6,270,801 B1 * | 8/2001 | Walter | B01J 2/14 | 424/458 |
| 6,354,728 B1 * | 3/2002 | Bretschneider | A01C 1/06 | 366/286 |
| 6,745,960 B1 * | 6/2004 | Myo | B01J 2/14 | 241/18 |
| 8,807,070 B2 * | 8/2014 | Jensen | B01J 2/006 | 118/303 |
| 9,861,026 B2 * | 1/2018 | Mehrkens | A01C 1/00 | |
| 2005/0155547 A1 * | 7/2005 | Lenius | B01J 2/006 | 118/303 |
| 2006/0032435 A1 * | 2/2006 | Huettlin | B01J 2/14 | 118/52 |
| 2006/0236925 A1 * | 10/2006 | Lund | A01C 1/00 | 118/19 |
| 2007/0228201 A1 * | 10/2007 | Naito | B01J 2/18 | 241/107 |
| 2007/0237893 A1 | 10/2007 | Moore et al. | | |
| 2009/0017224 A1 * | 1/2009 | Brendel | B05B 13/0257 | 427/557 |
| 2013/0273236 A1 * | 10/2013 | Reineccius | A01C 1/06 | 427/4 |
| 2016/0044954 A1 * | 2/2016 | Dunnebier | B05C 3/08 | 118/19 |

OTHER PUBLICATIONS

"The Extended European Search Report", dated Feb. 2, 2015, pp. 1-4.

* cited by examiner

METHOD AND DEVICE FOR COATING OR MIXING GRANULAR PRODUCTS, MORE IN PARTICULAR PEANUTS, WITH A SUBSTANCE

CROSS-REFERENCE TO RELATED APPLICATION

This application claims the priority benefit of EP14180859.2, filed on Aug. 13, 2014. The entirety of the above-mentioned patent application is hereby incorporated by reference herein and made a part of the specification.

BACKGROUND OF THE INVENTION

1. Field of the Invention

The present invention relates to a method and device for coating or mixing granular products, in particular food products, more in particular nuts, more in particular peanuts, with a substance.

2. Description of Related Art

Coating devices are known, for instance for coating seeds.

Nuts are traditionally coated in a rotary drum having a horizontal rotation axis. The drum is quite large, i.e. has a diameter of about 1.5-3 meter and a distance between the end walls of about 1 meter.

A batch of nuts is supplied into the drum. A coating substance which is often provided to coat nuts, is generally a combination of powder (or coating mix) and a water based liquid. The powder generally comprises starches and salt, sugar and can contain seasoning and/or flavourings and/or colouring ingredients. The water based liquid is generally sprayed into the drum separately. Other ingredients may also be added. Some of the ingredients may be dissolved in the water based liquid prior to mixing with the nuts. The nuts, coating mix and liquid are mixed inside the compartment during the rotation of the bottom part.

After being coated with the coating substance, the nuts are fried in oil for a short period of time or oven roasted (or air/dry roasted) for some period of time. The result is a nut covered with a coating layer.

In the present invention, it was recognized that a coater having a horizontal axis of rotation is quite cumbersome. The coating process takes quite long. Moreover, the coating process is quite dependent on human operators and it was found to be very difficult or impossible to automate this coating process.

Furthermore, the size of the known coating drum for nuts is quite large and the known drum requires a lot of space. This is a further disadvantage.

Other devices for coating other kinds of products are also known. For instance, some coating devices may have a vertical axis of rotation. Generally the bottom part is rotary and a vertical circumferential side wall is stationary.

In the present invention, the insight was developed that known vertical axis coaters are quite problematic for various kinds of granular products, in particular nuts and more in particular peanuts. It was recognized that the coating substance is quite sticky, and tends to stick to every part of the coater i.e. the bottom and the side walls.

DE 19750042 A1 discloses a method and device for coating a granulate with a coating layer. U.S. Pat. No. 5,582,643 discloses a centrifugal tumbling granulating-coating apparatus for coating high quantities of a powder or granular material in batches. DE 4411058 A1 discloses a rotary spray coating unit for seed or other granular materials.

The coating substance also tends to stick to utensils inside the coater, such as an atomizer disk, baffles for mixing the mass, the exit opening and other parts. This stickiness not only makes the operation cumbersome, but also hinders cleaning of the device and the utensils. Cleaning however is essential for maintaining the required processing and hygienic circumstances.

Therefore, coaters having a vertical axis of rotation were found to be unsuitable for various granular products, in particular sticky products such as coated nuts, more in particular peanuts.

SUMMARY OF THE INVENTION

It is an object of the invention to provide a method and device for coating or mixing granular products with a substance, in particular for coating or mixing granular products which form a sticky mass together with the substance.

It is an object of the invention to provide a method and device for coating or mixing granular products with a substance, wherein the products are hard enough to cause abrasive action and wherein the mixture of products and substance forms a sticky mass.

It is in particular an object of the invention to provide an improved device for coating nuts, more in particular peanuts.

It is a further object of the invention to provide an alternative method and device for coating or mixing granular products with a substance.

In order to achieve at least one object, the invention provides a device for coating or mixing granular products, in particular food products, more in particular nuts, even more in particular peanuts, with a substance, the device comprising a compartment defined by a rotary bottom part and a stationary circumferential side wall, the device further comprising:

a product supply for supplying the products into the compartment, a substance supply for supplying a substance into the compartment, a drive for rotating the rotary bottom part about its substantially vertical axis, a scoop for redirecting an upper portion of the rotating mixture of products and substance which moves along the side wall inwardly for mixing the products and the substance, the scoop comprising a curved surface which at an upstream end of the scoop extends substantially parallel to the stationary circumferential side wall and curves inwardly, wherein the inner surface of the compartment which is contacted by a mixture of the products and the substance, more in particular the rotary bottom part and the stationary circumferential side wall, is formed by non-stick parts which are exchangeable, wherein the exchangeable non-stick parts are partially or completely manufactured from or coated with a non-stick material, wherein said non-stick parts are mechanically connected to the device via detachable connectors, allowing fast replacement of worn-out non-stick parts by new, same non-stick parts. It should be noted that non-stick materials of which parts of the present invention are partially or completely coated with or manufactured of may comprise Teflon (polytetrafluoroethylene (PTFE)), Si—O-based ceramic coatings, nickel based alloy coatings (Hastelloy®), High Molecular Poly Ethylene (HMPE), or DLC (Diamond Like Carbon).

It was recognized in the present invention that conventional coaters having a vertical axis are not suitable for sticky products or for handling a sticky mass of products and coating substance. This is due to the fact that the mixture of products and substance tends to stick to the wall and bottom material. The wall and bottom are generally partially or completely manufactured from or coated with a corrosion resistant alloy such as stainless steel. The further insight was developed that coating the wall and bottom parts with a non-stick coating such as Teflon (polytetrafluoroethylene, or PTFE) also does not work, because the abrasive effect of the products may be so strong that the coating is sanded off the stainless steel substrate in a very short period of time. The abrasive effect takes place as a result of the hardness of the products, but may also be caused by the powder. Even softer products such as fruits cause abrasion when rotating at the required rotational speed.

The present invention has a particular advantage in that a device with a vertical axis can be used for coating products which are hard enough to cause abrasive action. A coating mix may be used in combination with a water based liquid substance, wherein the products which are hard enough to cause abrasive action and the substance form a sticky mass. Obviously, the device of the present invention may be used for coating other products as well, such as non-hard products, and products which in combination with the substance form a non-sticky mass. Instead of a water based liquid, an oil based liquid or a different kind of liquid may also be used for instance in a mixing process.

The mixing process may for instance have the object of glazing the food products, seasoning or flavouring the food products.

In an embodiment, a further advantage over the known tumbler for coating peanuts is that the coating process with the present invention may be fully or almost fully automated and may no longer require the supervision of a human operator, or at least substantially less supervision than the known drum having a horizontal axis.

In an embodiment, the present invention has the advantage that the coating process is carried out quickly.

In an embodiment, the present invention has the advantage that the cleaning of the device can be carried out quickly. Because of the non-stick material, there may be less need for a human operator to enter the device for cleaning purposes than similar devices having a stainless steel inside.

In an embodiment, the present invention has the advantage that the quality of the coating process is improved, in particular that the coating is applied more homogenous over the products.

A further advantage of the present invention is that the quality of the product is very constant.

A further advantage of the present invention is that the technology can be applied for a broad range of products and applications.

In an embodiment, the present invention has an advantage that the device is more robust and more reliable than known devices for coating products.

The present device can be used for coating granular products with a substance and for mixing granular products with the substance. In case of coating, the substance can be indicated as a coating substance. According to an embodiment of the present invention the substance or coating substance is a mixture comprising at least a powder (also referred to as coating mix) and a liquid. The powder may comprise for example starch(es), salt, sugar(s), seasonings, flavourings, colouring ingredients and any combination thereof. The liquid is preferably a water based liquid, but may also be an oil-based liquid.

In an embodiment, the present invention is more compact than known devices for a same batch size of products.

The advantages may not all apply for each embodiment. Some embodiments may have different advantage(s) than others.

The replaceable non-stick parts have to be replaced after a certain period of time. The device of the present invention advantageously requires only a limited downtime and can be back in operation relatively quickly after replacement of one or more non-stick parts. This is quite different from a device where non-stick coatings are applied on stainless steel, because in that case the stainless steel parts also should be replaced.

The replaceable non-stick parts are not steel parts partially or completely coated with a non-stick layer. The non-stick parts according to the invention have a much greater thickness and strength than a non-stick coating such as a Teflon coating would have. A Teflon coating on a steel substrate typically has a relatively small thickness of only 0.1 mm or less. This thickness is too small to be of any practical use, because the abrasive action of the peanuts removes the non-stick coating in a relatively short period of time, bringing back the sticking problems associated with stainless steel.

Therefore, it will be understood that the non-stick parts of the present invention are not parts of a construction material having a non-stick coating, but instead parts partially or completely manufactured from or coated with a non-stick material having a thickness of at least 1 mm, preferably 2-15 mm. A thickness of about 3 mm was found to be very suitable. The thickness allows a substantial wear before the non-stick part needs to be replaced.

In an embodiment, the entire inner surface which is contacted by the mixture of the products and the substance is formed by exchangeable non-stick parts so that the rotating mixture of products and substance cannot contact the stainless steel anywhere.

The term "granular products" is used to indicate products with a diameter of between 4-40 mm. The present invention is in particular suitable for coating nuts. In this document, peanuts are defined as falling within the definition of the term nuts. The granular products, in particular nuts, more in particular peanuts, may be raw or treated, in particular cooked, fried, pre-fried, grilled or heat treated.

The granular products may be nuts, but may also be fruit-based products, seeds and more in general snack-type food products. Other kinds of food products may also be coated or mixed with a substance.

In an embodiment, the entire surface of the bottom part and the side wall, preferably the entire inner surface of the side wall, is formed by replaceable non-stick parts.

In an embodiment, the replaceable non-stick parts are solid parts partially or completely manufactured from or coated with a solid non-stick material.

In an embodiment, the bottom part comprises a central bottom part and a circumferential bottom part which is annular and extends around the circumference of the central bottom part, wherein the circumferential bottom part is partially or completely manufactured from or coated with a non-stick material and is detachably connected to the central bottom part and is configured to be replaced separately from the central bottom part when it is worn out. In an embodiment, the central bottom part and the circumferential bottom part are solid parts partially or completely manufactured from or coated with a non-stick material. The bottom part is configured to be mechanically connected to the device via detachable connectors.

This embodiment is based on the insight that the outer part of the bottom wears much quicker than the central part. The possibility to replace the outer part of the bottom part separately makes the device more cost-efficient and reduces downtime.

In an embodiment, the stationary circumferential side wall comprises an outer side wall which is manufactured from stainless steel, such as for example S30400 (304) or 531606 (316), and wherein the inside of the stationary circumferential side wall is formed by at least one non-stick insert panel which is partially or completely manufactured from or coated with a non-stick material, in particular Teflon, which covers the outer side wall, wherein the at least one non-stick insert panel is manufactured separately from the outer side wall and is mechanically connected to the outer side wall in a detachable manner and is configured to be replaced separately from the outer side wall when it is worn out.

The at least one insert panel can be replaced quickly and results in a long uptime and a short downtime.

In an embodiment, the stationary circumferential side wall comprises an outer side wall which is manufactured from stainless steel, and wherein the inside of the stationary circumferential side wall is formed by a single, non-stick insert panel which is curved and extends over the entire inside of the stationary circumferential side wall which is contacted by the mixture of products and substance, thereby creating a single seam where two opposite ends of the insert panel meet one another in an abutting manner, wherein the at least one non-stick insert panel is manufactured from a single piece of material which in a flat state has a substantially rectangular form having a recess in one side of the rectangle, the single piece of sheet material having a cylindrical form in the installed state, wherein the recess fits around a frame of a door of the device when the non-stick insert panel is installed.

It was found that the single insert panel allows a very rapid replacement when it is worn out. In an embodiment, the at least one non-stick insert panel is a solid panel partially or completely manufactured from or coated with a non-stick material.

The insert panel allows an easy replacement after a certain time period. The device can be back in operation after a limited downtime. The uptime is much longer than if a non-stick coating layer on the stainless steel side wall were used. A Teflon non-stick insert panel may have a thickness of at least 1 millimeters, in particular at least 2 mm, more in particular 2-15 mm.

It is noted that the non-stick insert panel and the divided bottom part together create an advantageous embodiment, but may be viewed independently. Accordingly, in another aspect the present invention also relates to a bottom part configured to be mechanically and exchangeable connected to a device according to the present invention. In still another aspect the present invention is also concerned with an insert panel configured to be mechanically and exchangeable connected to an outer side wall of a device according to the present invention. Still further the present invention also relates to a circumferential bottom part configured for the inventive divided bottom part. These parts are intended to be used for example as spare parts for replacing the respective worn-out non-stick parts of the device of the present invention.

In an embodiment, the rotary bottom part comprises a rotary dome shaped part which is exchangeable and is partially or completely manufactured from or coated with a non-stick material and is positioned centrally and below a spinning atomizer disk, the atomizer disk being configured for atomizing a water based liquid which is supplied to the compartment wherein the rotary dome shaped part is constructed to rotate at a higher and opposite speed than the rest of the rotary bottom part in order to keep the mixture of products and substance at a distance from the spinning atomizer disk and the shaft which drives the spinning atomizer disk. This advantageously avoids lumping of substance in the centre of the machine and keeps the products in circulation. Preferably the dome shaped part is partially or completely manufactured from or coated with High Molecular Polyethylene as non-stick material.

The rotary disk is connected to a disk drive which spins the rotary disk at a substantial speed. The rotary disk may be coupled to the dome shaped part. The water based liquid inlet is configured to let the water drop on the disk where it is immediately jetted to the outside by centrifugal forces exerted by the disk on the water particles. In this process, the water is converted into very small droplets, a process which is known as atomization.

In an embodiment, the device comprises an air supply for pressurized air, wherein a circumferential gap is defined between the stationary circumferential side wall and the bottom part, in particular the circumferential bottom part, wherein the air supply is configured to blow the air through said gap in order to provide an air seal between the bottom part and the stationary circumferential side wall, and wherein said gap has a substantially constant width over a substantial part of the height of the gap, and in particular a constant width over a height of at least 4 mm.

The bottom part can wear down considerably. Multiple millimeters of material may be removed due to the abrasive action of peanuts. The constant width over the height prevents the width of the gap from increasing when the bottom part wears down, and results in a longer uptime of the device.

In an embodiment, the bottom part comprises a conical surface which extends outwardly and upwardly from a lowest region of the bottom part toward the stationary circumferential side wall of the compartment, the conical surface being oriented at an angle of between 30 and 60 degrees relative to the horizontal, wherein a transition between the central bottom part and the circumferential bottom part is located along the conical surface.

In an embodiment, at the transition between the central bottom part and the circumferential bottom part an outer, upper ridge of the central bottom part protrudes above an adjoining ridge of the circumferential bottom part, in particular over at least 0.5 mm. This embodiment advantageously prevents wear at the transition.

In an embodiment, the central bottom part and the circumferential bottom part are partially or completely manufactured from or coated with PE (Polyethylene), in particular HMPE (High Molecular Polyethylene), and the at least one non-stick insert panel is partially or completely manufactured from or coated with Teflon. The Teflon was found to be very suitable for use in the insert panel because it can be curved quite easily in the required thickness. HMPE is very suitable for the bottom part, because it can be machined at high accuracy (low tolerance), is strong, resistant to wear, and has a non-stick characteristic.

In an embodiment, the device comprises a single, non-stick insert panel which is curved and extends over the entire inside of the side wall, thereby creating a single joint where the two opposite end regions of the insert panel meet one another, wherein the two ends of the insert panel abut.

This embodiment creates a downstream region which recedes over a distance relative to the upstream region. Advantageously, the abrasive products can pass the seam without damaging the insert panel.

In an embodiment, the device comprises a movable door for discharging the coated food products from the compartment, the device further comprising a door frame mounted in the side wall and accommodating the movable door, wherein at the upstream side of the frame the frame recedes over a receding distance relative to the non-stick insert panel and wherein at the downstream side of the frame the non-stick insert panel recedes over a receding distance relative to the frame.

The device comprises at least one scoop for redirecting a portion of the rotating mixture of products and substance. The scoop is connected to the stationary circumferential side wall and comprises a curved surface which at an upstream end of the scoop extends substantially parallel to the stationary circumferential side wall and curves inwardly in a direction of flow, and which in particular curves over an arc of at least 50 degrees.

In an embodiment, the device comprises a spinning atomizer disk for atomizing a water based liquid which is supplied to the compartment. The liquid may be sprayed onto the spinning atomizer disk from above. The spinning atomizer disk may be placed centrally at a distance above the bottom part. The atomizer disk may be replaceable. In an embodiment, the dome shaped part is coupled with an atomizer disk in order to rotate at the same speed, the atomizer disk being positioned above the dome shaped part.

In an embodiment, the substance supply for supplying a substance into the compartment comprises a separate supply channel for a liquid, preferably a water based liquid, a dosing device and a separate supply channel for the coating mix, wherein the rotary atomizer disk is provided in the compartment at a distance above the bottom, and wherein the liquid supply channel is configured to let the liquid, preferably the water based liquid engage the rotary atomizer disk which then ejects the liquid, preferably the water based liquid outwardly.

In an embodiment, the dome shaped part has a diameter at the base of less than half of a diameter of the compartment and more than one sixth of a diameter of the compartment and wherein in particular the dome shaped part has a height of less than one third of its diameter at the base.

The present invention further relates to a method of coating or mixing granular products, in particular food products, more in particular nuts, even more in particular peanuts, the method comprising:

providing a device described herein, and
supplying a quantity of granular products into the compartment,
supplying a quantity of substance into the compartment,
mixing the substance and the food products by rotating the bottom part about its substantially vertical axis of rotation, wherein the mixture of food products and substance may gradually wears the exchangeable non-stick parts,
discharging the coated food products from the compartment,
wherein after a certain period of time the worn-out exchangeable non-stick parts are detached and replaced by new, same non-stick parts.

The method has substantially the same advantages as the device according to the method. An advantage of the known tumbler for coating peanuts may be that the coating process with the present invention may be fully automated and may no longer require the supervision of a human operator.

In an embodiment of the method, the granular products are food products, in particular dried fruits, seeds and/or nuts for instance—but not limited to—cashew nuts, hazelnuts, almonds, walnuts, pistachio, macadamia, pecan, brasil, and in particular peanuts. The nuts can be processed (fried, roasted, blanched) or non-processed. In a preferred embodiment the invention relates to peanuts.

In an embodiment of the method, the mixture of the granular products and the substance is a sticky mass which sticks to stainless steel and wherein the granular products are hard enough to exert an abrasive action on the non-stick parts as a result of which the non-stick parts become worn out.

In an embodiment of the method, the mixture of the granular products and the substance is a sticky mass which sticks to stainless steel, wherein the granular products are products which are hard enough to exert abrasive action on the non-stick materials, e.g. Teflon and HMPE, as a result of which the non-stick parts become worn out. Nuts may be quite hard and have an abrasive effect. Moreover, the mixture of nuts and substance can be very sticky. This is due to the ingredients of the substance which comprises starch. Starch is very sticky.

In an embodiment of the method, a coating mix and a water based liquid are supplied separately to the compartment, wherein the water based liquid engages a rotary atomizer disk which ejects the liquid in very fine droplets outwardly, wherein the scoop redirects a portion of the rotating mixture of products and substance inwards during the rotary movement of the bottom part, and wherein a dome shaped part which rotates counter to the rotary bottom part and at a higher speed keeps the rotating mixture of products and substance at a distance from a shaft which drives the rotary atomizer disk and from the disk itself.

When the device is used for mixing, the substance may for instance comprise oil with herbs.

The present invention further relates to a method of manufacturing a device according to the invention, the method comprising providing:

a rotary bottom part and a stationary circumferential side wall,
a product supply for supplying the products into the compartment,
a substance supply for supplying a substance into the compartment,
a drive for rotating the rotary bottom part about its substantially vertical axis, and preferably
a scoop for redirecting an upper portion of the rotating mixture of products and substance which moves along the side wall inwardly, the scoop comprising a curved surface which at an upstream end of the scoop extends substantially parallel to the stationary circumferential side wall and curves inwardly,
characterized in that the method further comprises cutting at least one non-stick Teflon insert panel, a HMPE central bottom part, a HMPE circumferential bottom part and/or a scoop to size with a CNC-controlled cutting apparatus.

Variations in the device are conceivable. For instance, the axis of rotation may be exactly vertical or inclined at a slight angle.

It is to be understood that the insert panel of the present invention is different from a coating layer, which is the form in which Teflon is ordinary used. It was recognized in the present invention that coating layers of non-stick materials are not strong enough for the abrasive action of many food products and become damaged too quickly. Moreover, a coating layer cannot be replaced once damaged.

Conversely, an insert panel may have a greater thickness than a coating layer, which results in a longer lifespan of a non-stick part. Moreover, an insert panel can be replaced and a coating layer cannot. The same argument applies for the bottom part.

These and other aspects of the invention will be more readily appreciated as the same becomes better understood by reference to the following detailed description and considered in connection with the accompanying drawings in which like reference symbols designate like parts.

DESCRIPTION OF THE EMBODIMENTS

Figure 1:
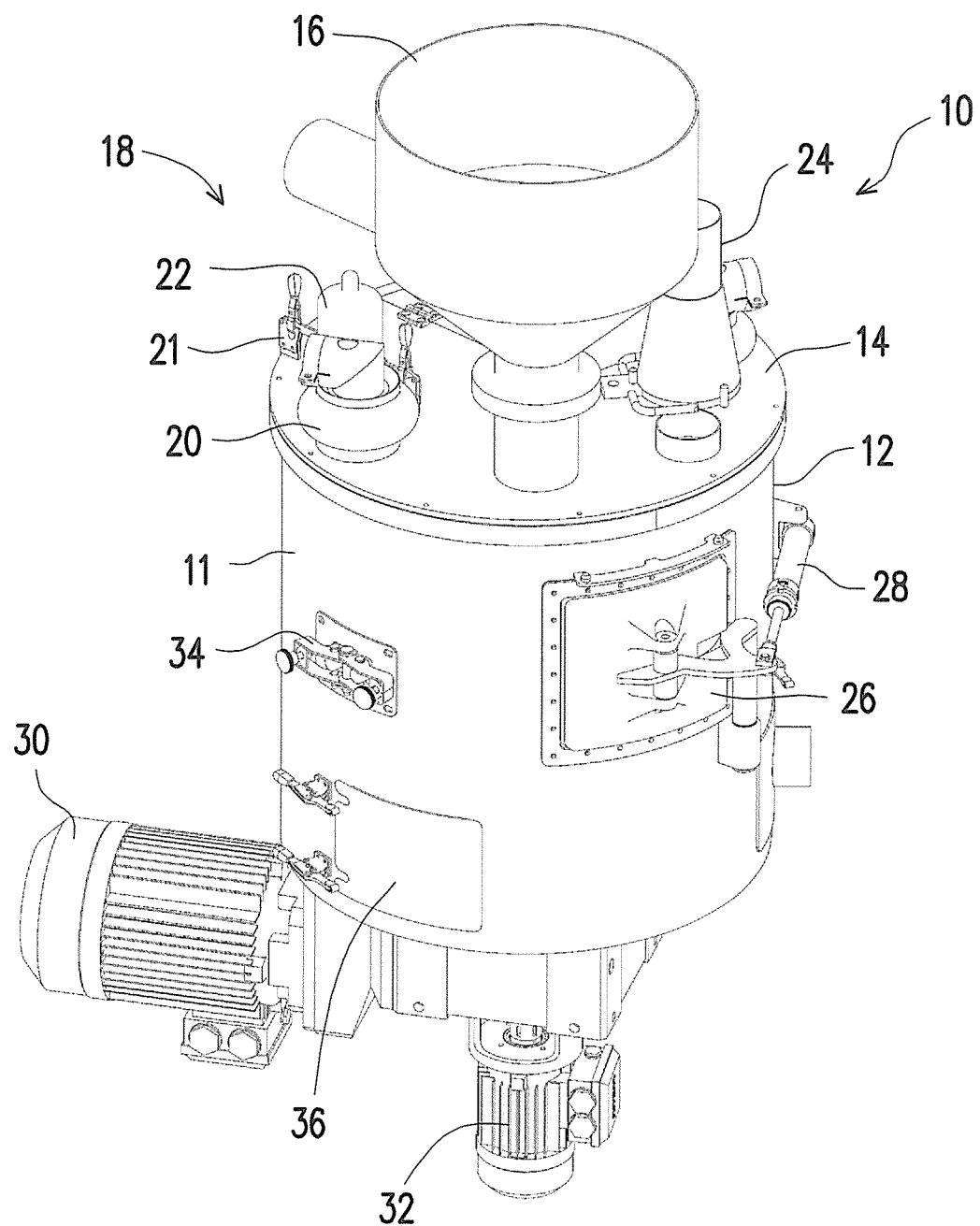
FIG. 1 shows a general isometric view of a device according to the invention.

Turning to FIG. 1, an embodiment of the device 10 according to the invention is shown. The device 10 comprises a stationary circumferential side wall 11 which comprises an outer vertical side wall 12 which is generally manufactured from steel.

The stationary circumferential side wall 11 defines a cylindrical shape. The device 10 further comprises a lid 14 at the top. A product supply which may have the form of a hopper 16 is provided for supplying the granular products into the device from above.

Further, a substance supply 18 is provided which comprises a separate supply channel 20 for a liquid, in particular water, a dosing device 21 and a separate supply channel 22 for the powder. It is also possible that the substance supply 18 comprises more separate supply channels, for instance when multiple different powders or liquids are to be supplied separately.

The device further comprises an air discharge 24. Further, a door 26 for discharging the products is provided in the stationary circumferential side wall 11. The door is operated with an actuator 28.

A first electric drive 30 for driving a rotary bottom part is provided, and a second electric drive 32 is provided for driving an atomizer disk. The drives are explained further below. A connection 34 is provided in the side wall for a scoop which is also explained in more detail below.

Further, an inspection door 36 is provided in the side wall for inspecting, a space below the compartment and for cleaning and maintaining this space.

The device 10 is a batch coater. In use, a batch of products and substance is supplied into the device and processed for a processing time period. At the end of the time period, the coated products are discharged as a batch from the device.

The device 10 is suitable for coating granular products, in particular food products, more in particular peanuts.

Figure 2A:
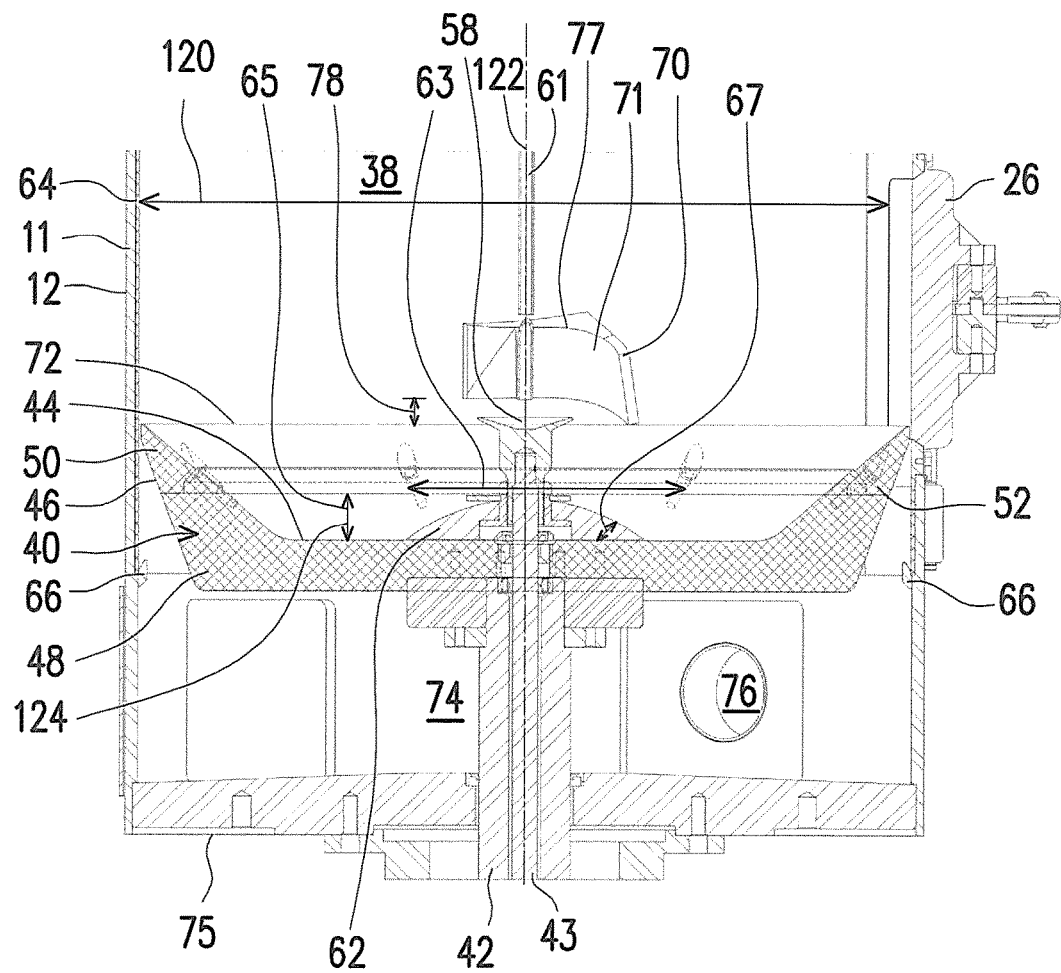
FIG. 2a shows a cross-sectional side view of a device according to the invention.

Turning to FIG. 2a, a compartment 38 is defined by the stationary circumferential side wall 11, a bottom part 40 and the lid 14 at the top. The bottom part may also be referred to as a bottom disk 40. The compartment 38 is cylindrical, i.e. is circular in top view. The compartment may have a diameter of 50-70 cm. The stationary circumferential side wall 11 is substantially vertical, but it is conceivable that the stationary circumferential side wall 11 is conical and tapers outwardly in an upward direction. The bottom part 40 is rotary and coupled to the drive 30 via a first, outer drive shaft 42.

The bottom part 40 comprises a lowest region 44 which may be oriented horizontally. The bottom part 40 further comprises an inclined surface 46 which is also referred to as a conical surface 46. The conical surface extends upwardly and outwardly from the lowest region 44.

The point where the conical surface 46 starts to rise from the bottom region 44 typically lies at a distance 124 of ⅓ to ⅔ the radius of the compartment from a central axis 122 of the compartment. The vertical axis 122 may be fixed.

The central bottom part and the circumferential bottom part may be partially or completely manufactured from or coated with HMPE. It was found that this material provides good non-stick qualities which allow processing of the sticky mass of peanuts and substance. Moreover, HMPE was found to provide good resistance to wear against the abrasive action of the peanuts. Despite this resistance to wear, the bottom part was found to wear off relatively quickly. Alternatively, other non-stick coatings may be applied to the central bottom part, e.g. Teflon (polytetrafluoroethylene (PTFE)), Si—O-based ceramic coatings, nickel based alloy coatings (Hastelloy®) or DLC (Diamond Like Carbon).

The bottom part 40 is divided into a central bottom part 48 and a circumferential bottom part 50. In the present invention, the insight was developed that the circumferential bottom part 50 wears a lot due to the abrasive action of the products, in more in particular wears more quickly than the central bottom part. This resulted in the insight that it would be advantageous to divide the bottom part into two separate parts. The circumferential bottom part has been made to be easy replaceable by connecting it in a detachable manner via bolts to the central bottom part 48. It is noted that the central bottom part 50 itself is also replaceable and needs to be replaced from time to time.

When the circumferential bottom part needs to be replaced, the entire bottom part 40 is removed from the compartment by uncoupling it from the shaft 42 and lifting it from the compartment. The bolts 52 are then removed and the worn out circumferential bottom part is replaced with a new circumferential bottom part. Then the opposite procedure is followed to re-install the bottom part 40.

The device 10 further comprises an atomizer disk 58 for atomizing a liquid which is supplied to the compartment 38.

The liquid supply comprises a channel 61 leading to a nozzle 60 positioned directly above the atomizer disk 58. The atomizer disk is driven by a shaft 43 which is provided inside the shaft 42. The atomizer disk is exchangeable.

Below the atomizer disk 58 and positioned centrally on the bottom is a dome shaped part 62. The dome shaped part 62 is rotary and forms part of the rotary bottom part 40.

The dome shaped part 62 is constructed to rotate at a higher and opposite speed than the rest of the rotary bottom part in order to keep the mixture of products and substance at a distance from the spinning atomizer disk and a shaft 43 which drives the spinning atomizer disk. Typically, the dome shaped part rotates at a speed of 2000-4000 rpm and the rest of the rotary bottom part is constructed to rotate at an opposite speed of 300-1000 rpm.

The dome shape part 62 keeps the mixture of products and substance at a distance from the shaft 43 which drives the atomizer disk 58. The dome shaped part typically has a diameter 63 at the base of less than one half of a diameter 120 of the compartment and more than one sixth of a diameter 120 of the compartment. The dome shaped part may have a height 65 of less than one third of its diameter at the base. A angle 67 at which the dome extends relative to the horizontal at the base may lie between 20 and 50 degrees.

The stationary circumferential side wall 11 comprises at least one non-stick insert panel 64 which is mechanically connected to the inside of the outer side wall 12. The non-stick insert panel 64 forms an inner surface of the stationary circumferential side wall 11. At least one non-stick insert panel (64) may be partially or completely manufactured from or coated with Teflon.

The outer side wall 12 is from stainless steel, which is the customary construction material in the food processing industry. The at least one non-stick insert panel 64 is partially or completely manufactured from or coated with a non-stick material. In particular Teflon was found to be a suitable non-stick material. The non-stick insert panel 64 is detachably mounted to the steel outer side wall 12 and is exchangeable.

The non-stick side panel 64 and the circumferential bottom part 50 form non-stick parts 64, 50 and form an inner surface of the compartment. The non-stick parts are mechanically connected to the device in a detachable manner, allowing replacement by new, same non-stick parts when the existing non-stick parts are worn out by abrasive action of the granular products.

The insert panel 64 rests on supports 66. The non-stick insert panel is curved. In particular, the insert panel 64 is a single panel which extends fully around the circumference of the compartment 38. In this way, a single seam 165 (or joint) is defined which extends vertically. A downstream end of the non-stick insert panel abuts an upstream end.

A scoop 70 is provided at the inner side of the side wall. A base 77 of the scoop is located at a distance 78 above an upper ridge 72 of the bottom part 40 and is mounted to the vertical wall 12. The distance may be 20 mm. The scoop has a curved guiding surface 71. The guiding surface extends substantially parallel to the side wall at the side wall and curves into the compartment. The scoop mixes the mass inside the compartment by redirecting a portion of the rotating mass into the center of the compartment. The scoop also shows the direction of rotation of the bottom part 40, which is clockwise when viewed from above. The scoop can be disconnected from the outside via the connection 34 shown in FIG. 1 and taken from the compartment, for instance for replacement. Multiple scoops may be provided.

The scoop 70 may have a position which in top view is about 60-120 degrees upstream of the door 26. The scoop has a double curvature and redirects a part of the flow inwardly and downwardly. The redirected part of the flow follows a helical trajectory when sliding along the surface 71 of the scoop. A further scoop 70 may be provided, in particular opposite the first scoop.

Below the bottom part 40, a space 74 is defined. An air supply hole 76 is provided in the stationary circumferential side wall 11 below the bottom part, for blowing air into the space 74 by a source of pressurized air. The space is closed at the bottom side by a bottom plate 75.

Figure 2B:
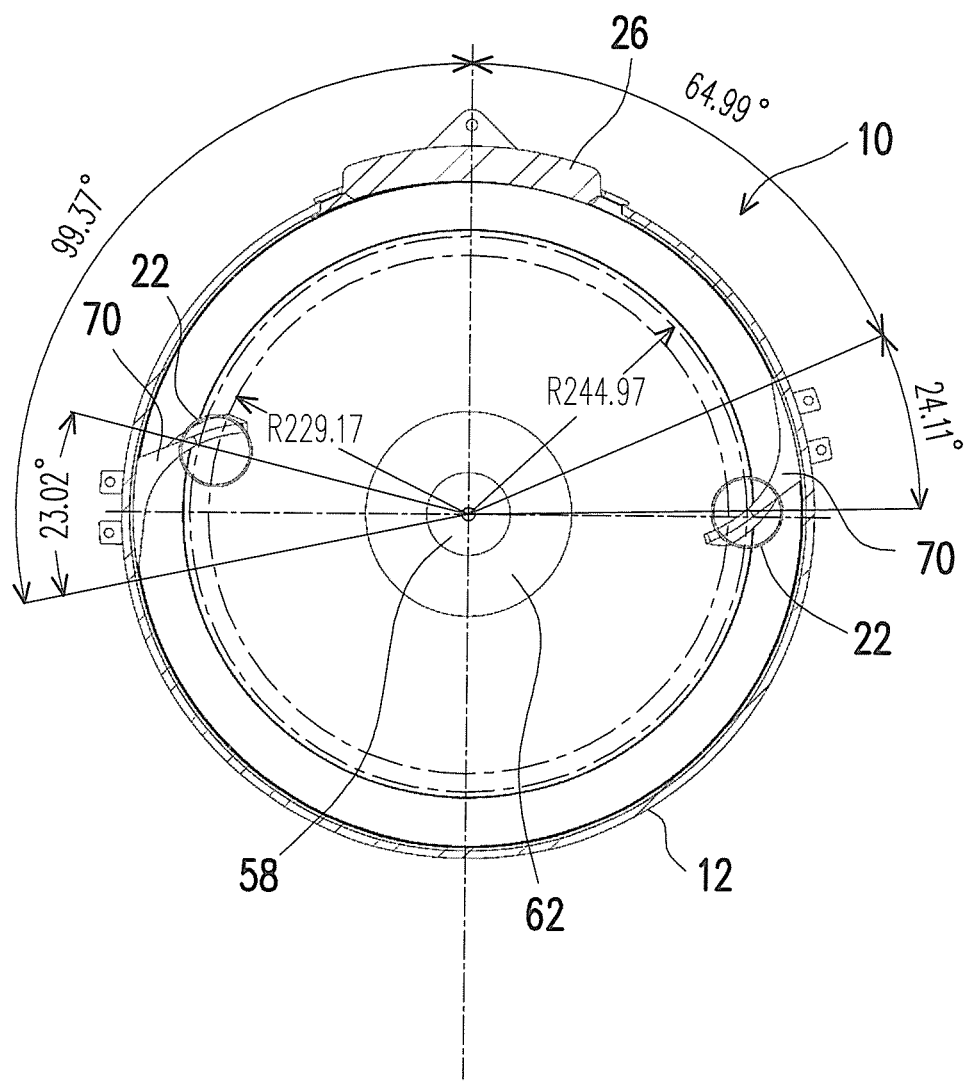
FIG. 2b shows a top view of the device according to the invention.

Turning to FIG. 2b, the separate supply channel 22 of the powder is located directly above the scoop 70. In this way, the powder which enters the compartment via the supply channel 22 falls directly on the redirected portion of the products and becomes mixed with the products instantly. Two supply channels 22 and two scoops 70 are provided.

Figure 3:
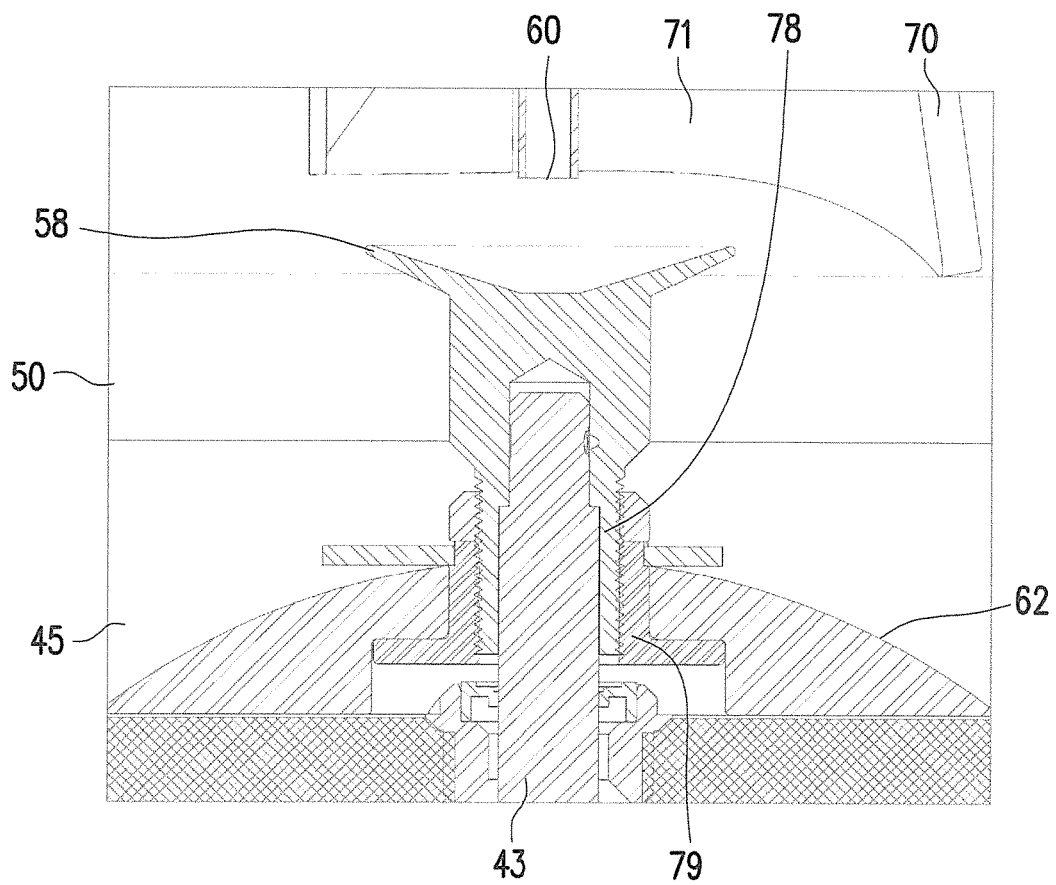
FIG. 3 shows a cross-sectional side view of a detail of a device according to the invention.

Turning to FIG. 3, the atomizer disk 58 is shown in more detail. The atomizer disk comprises a threaded portion 78 configured to be screwed into a mating threaded member 79 via which it is connected to the shaft 43. The atomizer disk can be unscrewed from the shaft 43.

Figure 4:
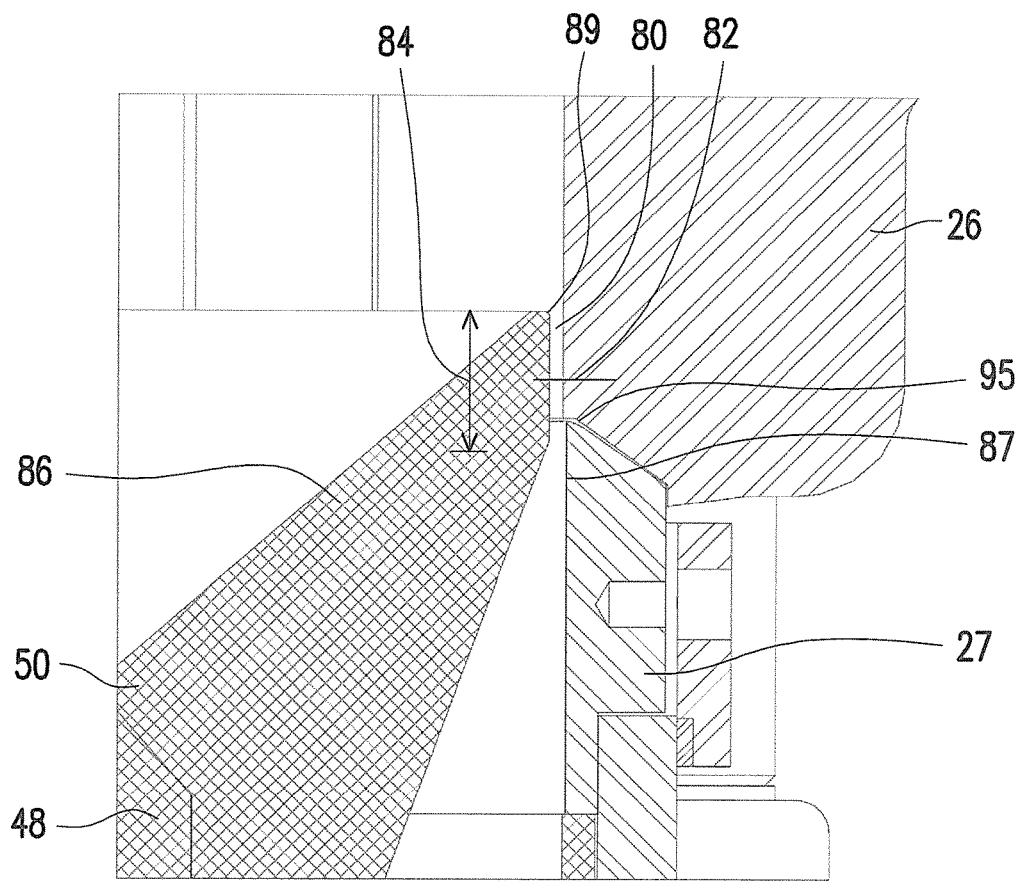
FIG. 4 shows a cross-sectional side view of an air gap between a bottom part and a side wall.

Turning to FIGS. 4 and 5, the door 26 is shown which in the closed position engages a threshold 27. An air gap 80 is provided between the circumferential bottom part 50 and the door 26 and the threshold 27. The air gap extends around the circumference of the rotary bottom part 40, i.e. the air gap is also present between the stationary circumferential side wall 11 and the rotary bottom part 40. In use, pressurized air is supplied into the space 74 below the compartment via the opening 76. The air then flows upward through the air gap 80 into the compartment. The air gap and the upward air flow create an air seal between the rotary bottom part 40 and the stationary circumferential side wall 11, which prevents any products from falling through the air gap.

A width 82 of the air gap is constant over a certain height 84. The height is measured from the upper and outer rim 89 of the circumferential bottom part to a point 87 on the outer side of the circumferential bottom part where the circumferential bottom parts turns away from the outer side wall 11 or the threshold 27. This height 84 allows the circumferential bottom part to wear, as is shown with the dashed lines 86. In use the abrasive action of the products gradually removes material from the circumferential bottom part 50. By providing the air gap with a constant width over a substantial part of the height 84, the air gap does not increase in size when the circumferential bottom part wears down.

The point 87 is about 1-2 mm lower than a ridge 95 of the threshold.

The constant width advantageously increases the effective life span of the circumferential bottom part. The height 84 typically is at least 5 mm, resulting in a life span of several weeks during normal operating conditions when coating peanuts. Without the constant width, the life span would be much less, because the air gap would quickly increase in size, resulting in a lower air velocity through the gap and as a result a leaking air seal.

The central bottom part 48 wears slower than the circumferential bottom part 50 and therefore has a longer life span, typically at least 10 weeks.

Figure 5A:
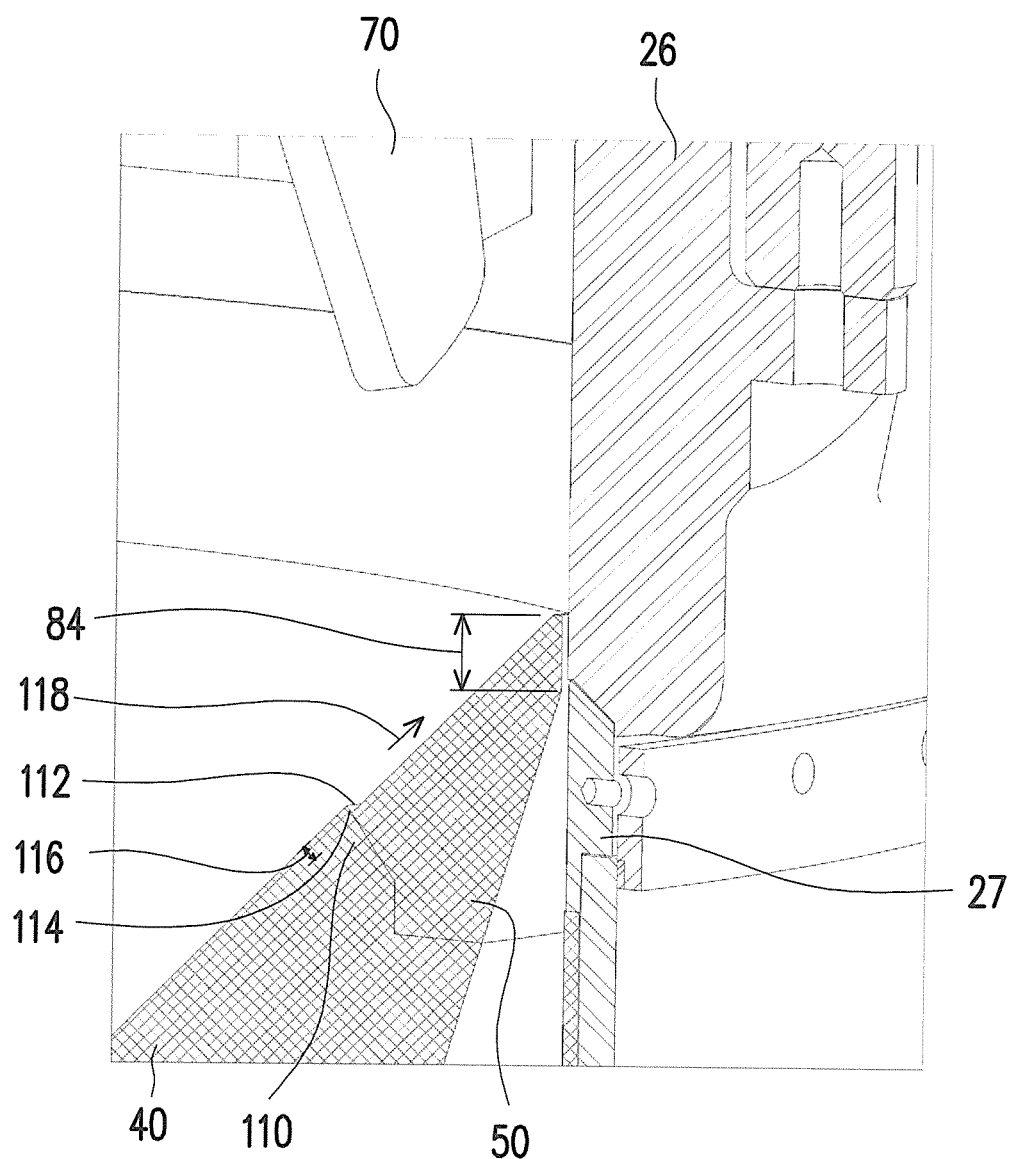
FIGS. 5a and 5b show an isometric side view of an air gap between a bottom part and a side wall.
Figure 5B:
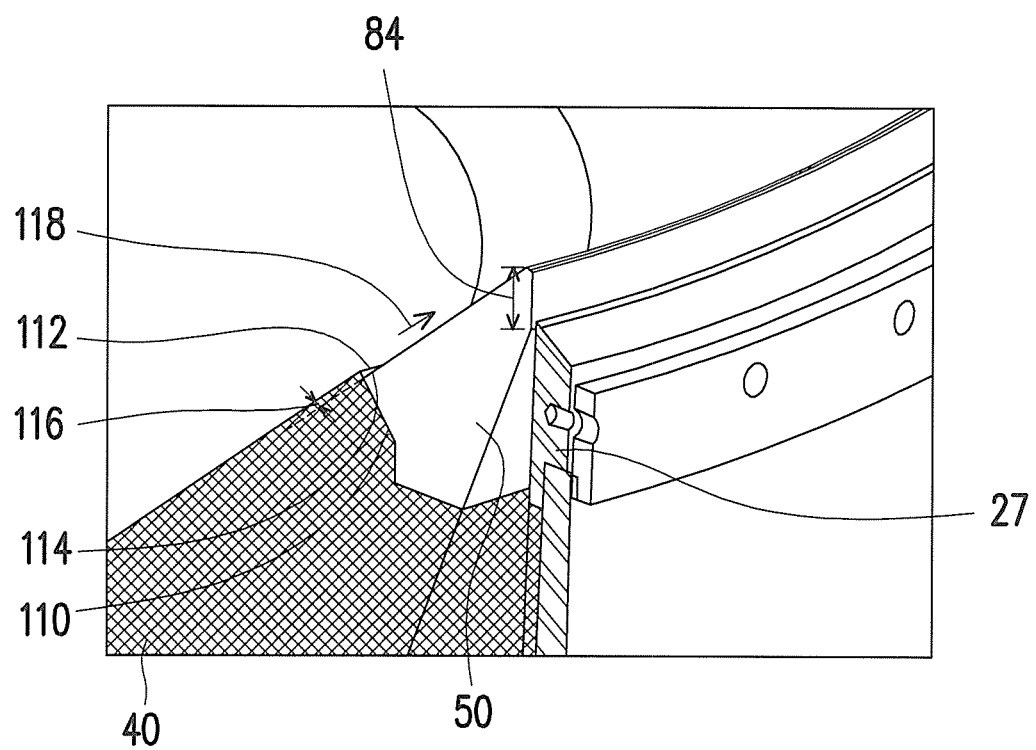

Turning in particular to FIGS. 5a and 5b, a transition 110 is provided between the central bottom part 48 and the circumferential bottom part 50. At the transition 110, an outer, upper ridge 112 of the central bottom part 48 protrudes over a distance 116 of at least 0.5, in particular between 1 and 1.5 millimeter above an adjoining ridge 114 of the circumferential bottom part 50. In the present invention the insight was developed that this protrusion prevents the circumferential bottom part 50 to wear at the transition. In use, the products move upwardly along the conical surface 46 in the direction of arrow 118. Because the products are hard enough to cause abrasive action, a flush transition was found to result in rapid wear at the transition and the protrusion prevents this.

Figure 6:
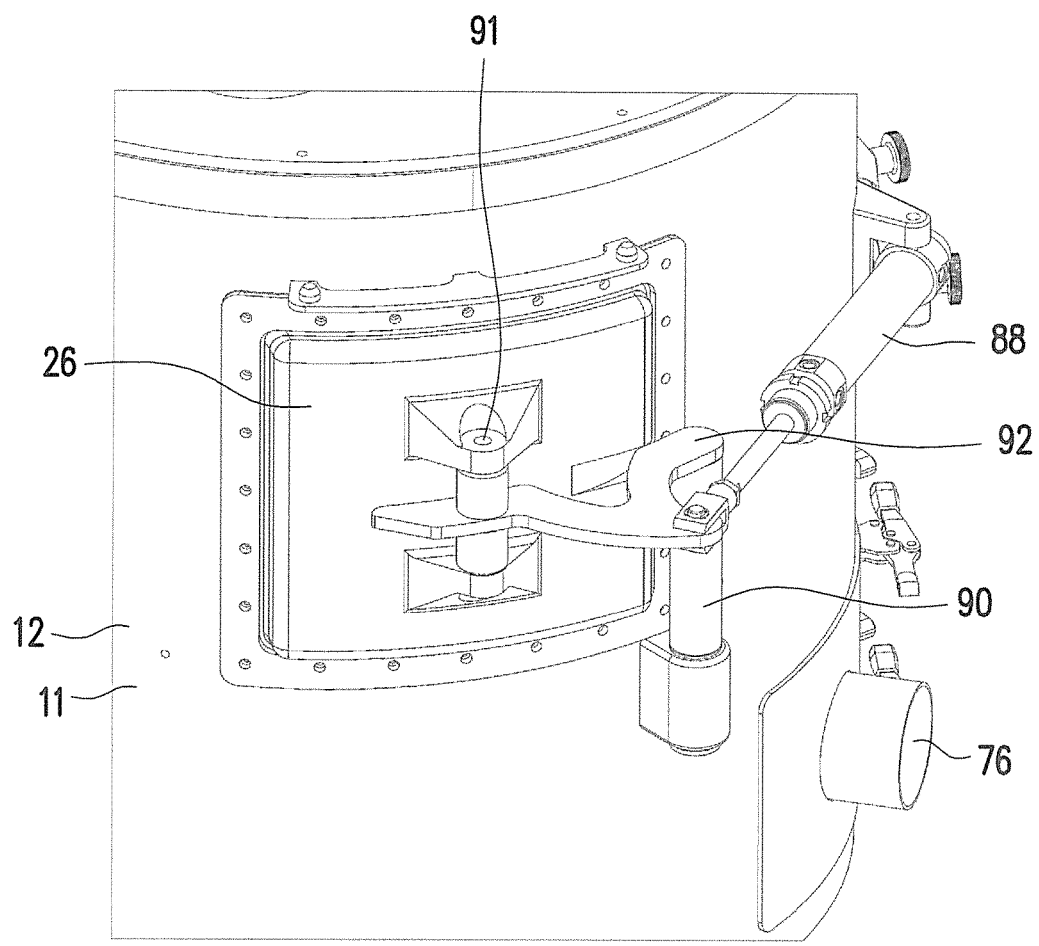
FIG. 6 shows an isometric side view of a door in a side wall of the device according to the invention.
Figure 7:
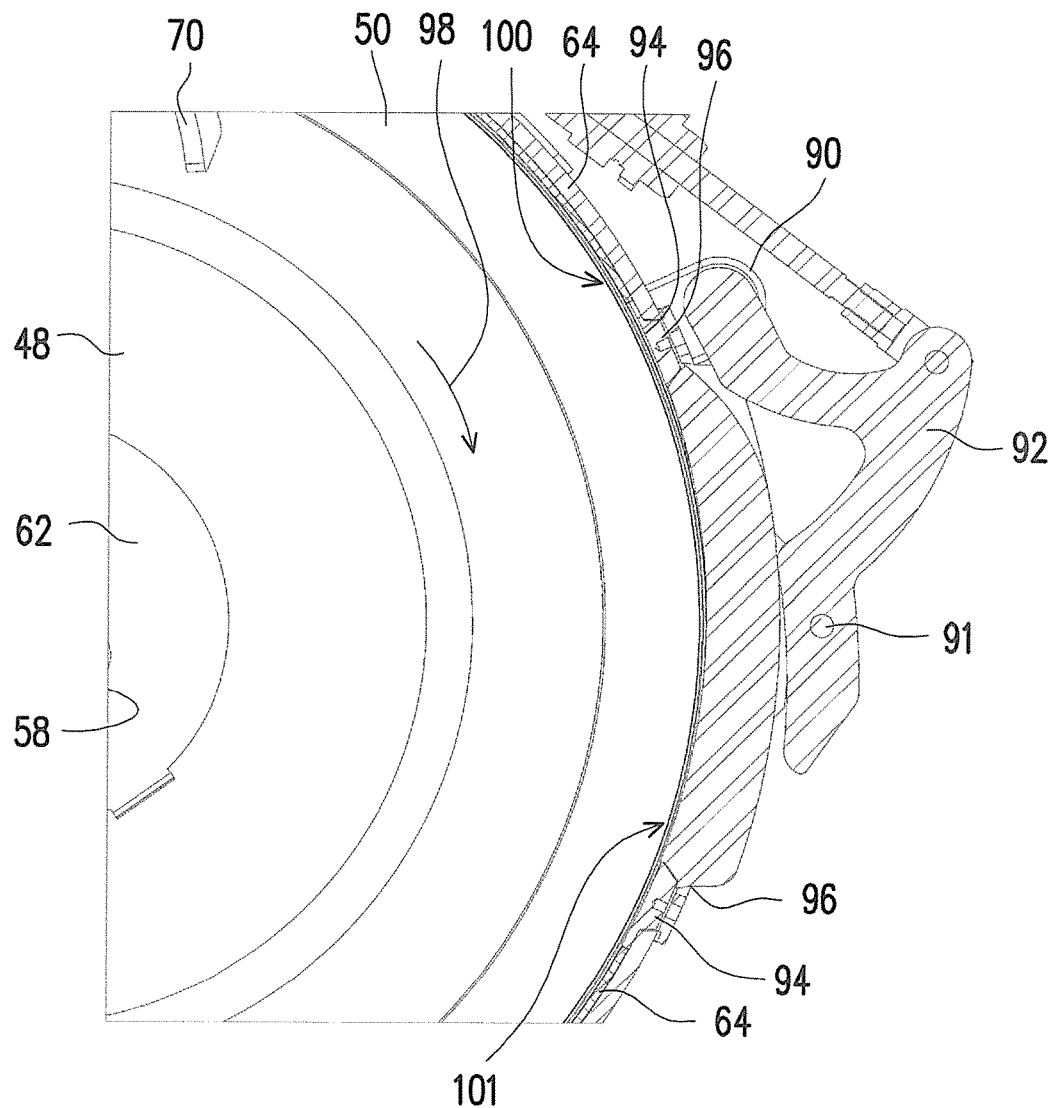
FIG. 7 shows a top view of a door in a side wall of the device according to the invention.
Figure 8A:
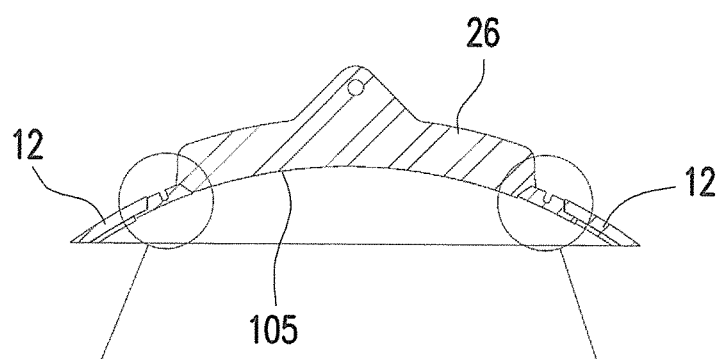
FIG. 8a shows a top view of a door frame and a door in the side wall of the device according to the invention.
Figure 8B:
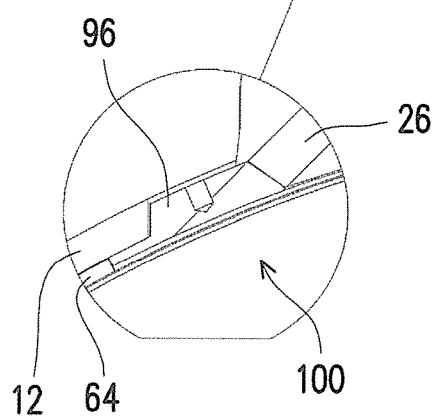
FIG. 8b shows a top view of a detail of a door frame at an upstream side in the side wall of the device according to the invention.
Figure 8C:
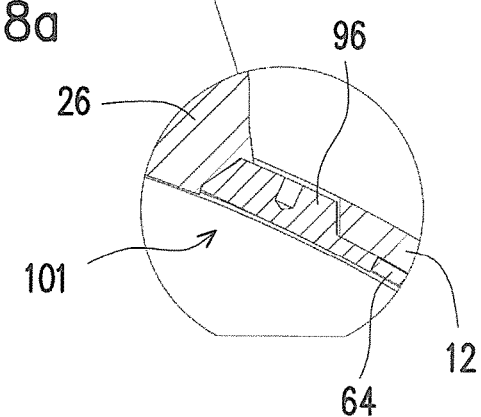
FIG. 8c shows a top view of a detail of a door frame at a downstream side in the side wall of the device according to the invention.
Figure 8D:
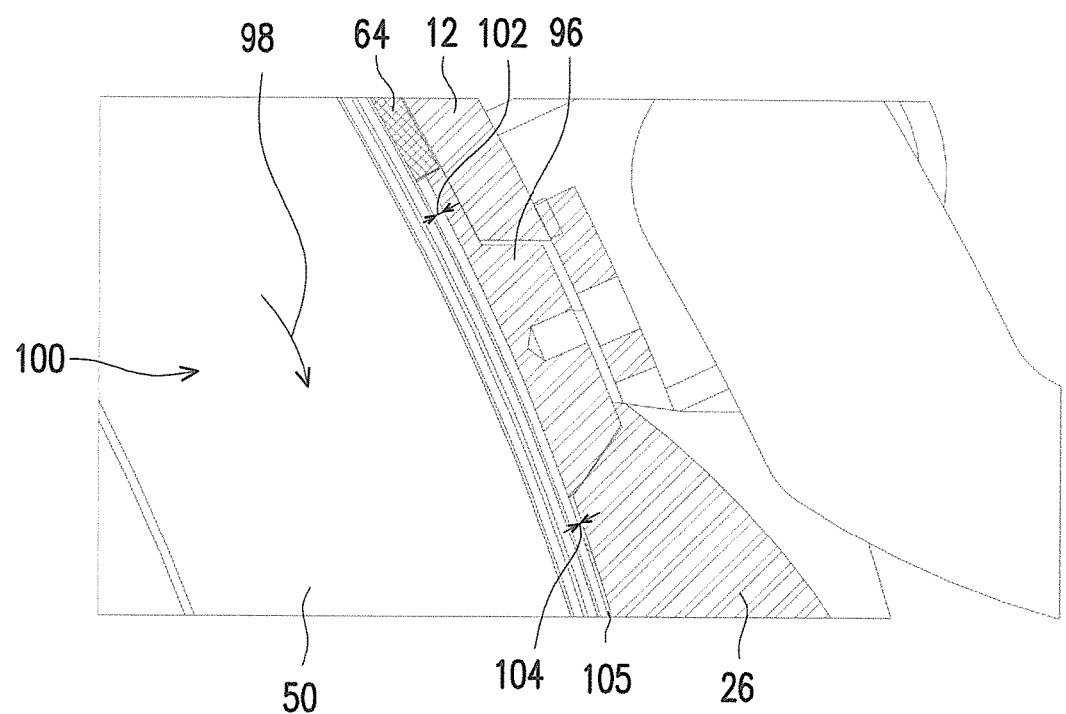
FIG. 8d shows a further enlarged top view of a detail of a door frame at an upstream side in the side wall of the device according to the invention.

Turning to FIG. 6, the door 26 is shown in the stationary circumferential side wall 11 of the device 10. A pneumatic or hydraulic cylinder 88 is provided to operate the door 26 via. The door pivots about a first vertical pivot axis 90 and a second vertical pivot axis 91. An intermediate member 92 is provided which pivots about the axis 90. The door itself pivots relative to the intermediate member about axis 91.

Turning to FIGS. 7 and 8a-8d, the door 26 fits in a frame 94 which has vertical posts 96. In use the products rotate in the clockwise direction, indicated with arrow 98. The vertical posts 96 adjoin the insert panel 64. At the upstream side 100 of the door, the vertical post of the frame is recessed over a distance 102 of at least 0.5 mm, in particular about 1 mm, relative to the insert panel 64. In this way, the mixture of products and substance pass the transition without inflicting damage to the vertical post of the frame. The door 26 itself is slightly recessed relative to the frame at the upstream side 100 for a same reason.

At the downstream side 101, the situation is reversed. The vertical post 96 of the frame is slightly recessed relative to the door and the insert panel 64 is slightly recessed relative to the vertical post 96 of the frame. The recess distance 102 between the insert panel 64 and the vertical post of the frame may each time be around 1 mm. The door has an inner face 105. A recess distance 104 between the vertical post of the frame and the door may be at least 0.5 mm and typically about 1 mm.

Figure 9:
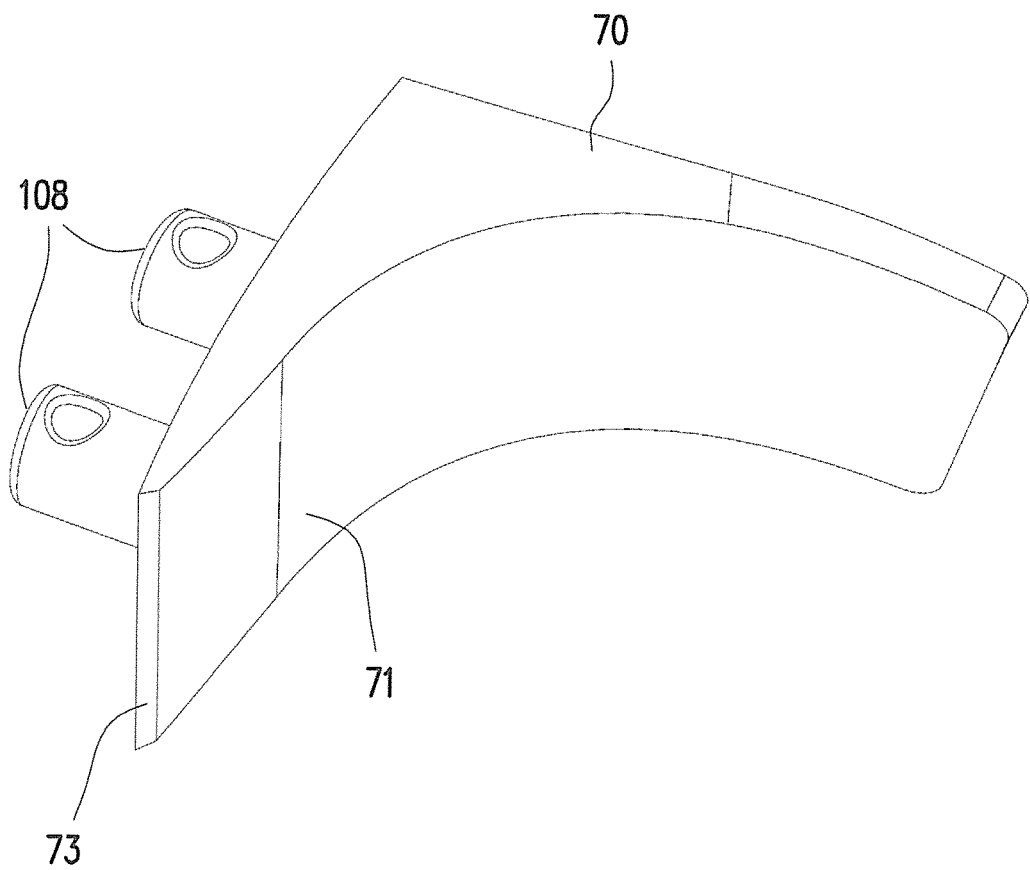
FIG. 9 shows a scoop used in the device according to the invention.

Turning to FIG. 9, the scoop 70 is shown. The scoop is configured to redirect a part of the rotating product flow. The scoop is partially or completely manufactured from or coated with HMPE. The scoop comprises two quick-couplings 108 which protrude through a hole in the side wall to the outside and are connected to the side wall via coupling 34. The quick couplings 108 allow fast replacement of the scoop.

At an upstream end 73, the scoop extends substantially parallel to the stationary circumferential side wall and curves inwardly in a direction of flow. The scoop may curve over an arc of at least 50 degrees, more in particular 70 degrees. An outer side of the scoop may be curved in order to match the form of the stationary circumferential side wall 11. The scoop may be configured to direct the portion of the flow slightly downwards.

Figure 10A:
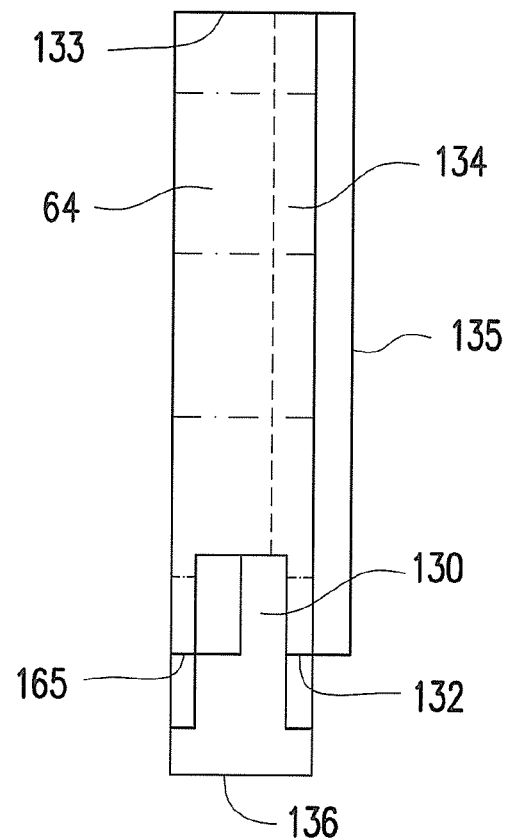
FIG. 10a shows a non-stick insert panel in a flat state.
Figure 10B:
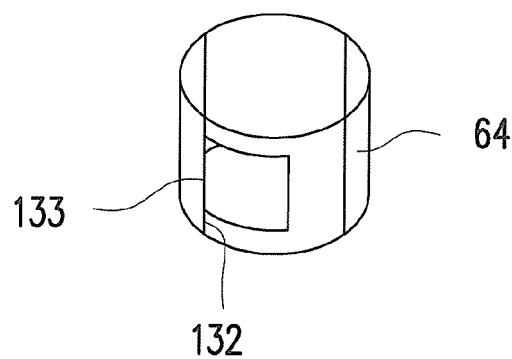
FIG. 10b shows a non-stick insert panel in a round state.

Turning to FIGS. 10a and 10b, the non-stick insert panel 64 is shown separately and in a flat state in FIG. 10a and in the round state in FIG. 10b. The non-stick insert panel has a length 135 of 1700-1900 mm, in particular about 1800 mm and a width 136 of 350-450 mm, in particular about 400 mm. The non-stick insert panel 64 has a rectangular recess 130 which fits around the frame of the door. The recess 130 has a length of about 290 mm and a width (which in use is the height) of about 270 mm. An end 132 is configured to meet an opposite end 133 in an abutting manner when the insert panel 64 is inserted into the compartment against the outer side wall. A dashed line 134 indicates the level of the outer and upper rim 89 of the circumferential bottom part 50.

Operation

When the device is operated, a batch of granular products, in particular food products, more in particular nuts, even more in particular peanuts, is supplied into the compartment 38. The product may be metered into the device by a pre-set batch weight.

A quantity of water based liquid and a quantity of powder is supplied to the compartment. The water based liquid is supplied via the atomizer disk where it is atomized into spray of very fine droplets.

The water based liquid and the powder form a substance. The substance and the products are mixed by rotating the bottom part about its vertical axis of rotation, thereby creating centrifugal action. The rotation of the bottom part causes the products and the substance to become mixed. The mixture of products and substance moves upwards along the conical surface to the side wall and is turned back into the compartment by the scoop 70. This movement repeats itself.

In case of coated peanuts, the mixture is a sticky, abrasive mass.

After a certain time period which may vary on the requirements, the products are ready and discharged from the drum via the door 26.

Typically, when this sequence is repeated a number of times, the non-stick parts or at least some of the non-stick parts are worn out. This is due to the fact that the non-stick material is not a high strength material. It is strong enough for an acceptable number of operations, but not as strong as for instance stainless steel or another corrosion resistant alloy.

Therefore, after a certain period of time the worn-out detachable non-stick parts 50, 64 are removed and replaced by new, same non-stick parts. This replacement operation can be carried out quite easily and quickly. When the device has been fitted with replacement parts 50, 64, the operation can recommence.

The present invention is especially suitable for products which are hard enough to exert an abrasive action on non-stick materials such as Teflon and HMPE, and wherein the mixture of the granular products and the substance is a sticky, abrasive, mass which sticks to stainless steel.

Advantageously, at least one non-stick Teflon insert panel 64, a HMPE central bottom part 48 and/or a HMPE circumferential bottom part 50 may be cut to size with a CNC controlled cutting apparatus. This allows rapid replacement with vary narrow tolerances.

The coating process may be fully automated and may no longer require the supervision of a human operator.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage. As long as not stated otherwise features of different embodiments of the present invention can be combined with each other.

What is claimed is:

1. A device for coating or mixing granular products, with a substance, the device comprising a compartment defined by a rotary bottom part and a stationary circumferential side wall, the device further comprising:
   a product supply for supplying the products into the compartment,
   a substance supply for supplying the substance into the compartment,
   a drive for rotating the rotary bottom part about its substantially vertical axis,
   a scoop for redirecting an upper portion of the rotating mixture of products and substance which moves along the stationary circumferential side wall inwardly, the scoop comprising a curved surface which extends substantially parallel to the stationary circumferential side wall and curves inwardly at an upstream end of the scoop,
   wherein the inner surface of the compartment which is contacted by a mixture of the products and the substance is formed by non-stick parts which are exchangeable by means of mechanical connection, wherein the non-stick parts are partially or completely manufactured from or coated with a non-stick material, allowing fast replacement of worn-out non-stick parts by new, same non-stick parts, and the scoop is connected to the stationary circumferential side wall via at least one releasable mechanical connector, allowing rapid and easy replacement of the scoop.

2. The device according to claim 1, wherein the rotary bottom part and the stationary circumferential side wall which is contacted by the mixture of the products and the substance are formed by non-stick parts.

3. The device according to claim 1, wherein the rotary bottom part comprises a central bottom part and a circumferential bottom part which is annular and extends around the circumference of the central bottom part, wherein the circumferential bottom part is partially or completely manufactured from or coated with a non-stick material and is detachably connected to the central bottom part and is configured to be replaced separately from the central bottom part when it is worn out, and
   wherein the stationary circumferential side wall comprises an outer side wall which is manufactured from stainless steel, and wherein the inside of the stationary circumferential side wall is formed by at least one non-stick insert panel which is partially or completely manufactured from or coated with a non-stick material which covers the outer side wall, wherein the at least one non-stick insert panel is manufactured separately from the outer side wall and is mechanically connected to the outer side wall in a detachable manner and is configured to be replaced separately from the outer side wall when it is worn out.

4. The device according to claim 3, wherein the rotary bottom part comprises a conical surface which extends outwardly and upwardly from a lowest region of the rotary bottom part toward the stationary circumferential side wall, the conical surface being oriented at an angle of between 30 and 60 degrees relative to the horizontal, wherein a transition between the central bottom part and the circumferential bottom part is located along the conical surface.

5. The device according to claim 3, comprising an air supply for pressurized air, wherein a circumferential gap is defined between the stationary circumferential side wall and the rotary bottom part, wherein the air supply is configured to blow the air through the circumferential gap in order to provide an air seal between the rotary bottom part and the stationary circumferential side wall, and wherein the circumferential gap has a substantially constant width over a substantial part of a height of the circumferential gap.

6. The device according to claim 5, wherein the circumferential gap is defined between the stationary circumferential side wall and the circumferential bottom part.

7. The device according to claim 5, wherein the circumferential gap has a substantially constant width over a height of at least 4 mm.

8. The device according to claim 3, wherein the central bottom part and the circumferential bottom part are partially or completely manufactured from or coated with a synthetic material.

9. The device according to claim 8, wherein the synthetic material is polyethylene.

10. The device according to claim 9, wherein the polyethylene is high molecular weight polyethylene.

11. The device according to claim 3, wherein the at least one non-stick insert panel is manufactured from or coated with polytetrafluoroethylene.

12. The device according to claim 3, comprising a movable door for discharging the coated products from the compartment, the device further comprising a door frame mounted in the stationary circumferential side wall and accommodating the movable door, wherein the door frame recedes over a receding distance relative to the non-stick insert panel at the upstream side of the door frame, and the non-stick insert panel recedes over a receding distance relative to the door frame at the downstream side of the door frame.

13. The device according to claim 3, wherein at a transition between the central bottom part and the circumferential bottom part an outer, upper ridge of the central bottom part protrudes above an adjoining ridge of the circumferential bottom part.

14. The device according to claim 13, wherein the upper ridge of the central bottom part protrudes above the adjoining ridge of the circumferential bottom part over a distance of at least 0.5 mm.

15. The device according to claim 1, wherein the rotary bottom part comprises a rotary dome shaped part which is exchangeable and is partially or completely manufactured from or coated with a non-stick material and is positioned centrally and below a spinning atomizer disk, the spinning atomizer disk being configured for atomizing a water based liquid which is supplied to the compartment, wherein the rotary dome shaped part is constructed to rotate at a higher and opposite speed than the rest of the rotary bottom part in order to keep the mixture of products and substance at a distance from the spinning atomizer disk and a shaft which drives the spinning atomizer disk.

16. The device according to claim 15, wherein the rotary dome shaped part is constructed to rotate at an opposite rotational speed of 2-13 times the rotational speed of the rest of the rotary bottom part.

17. The device according to claim 16, wherein the rotary dome shaped part is constructed to rotate at a speed of 2000-4000 rpm and the rest of the rotary bottom part is constructed to rotate at an opposite speed of 300-1000 rpm.

18. The device according to claim 15, wherein the dome shaped part has a diameter at the base of less than a half of a diameter of the compartment and more than one sixth of the diameter of the compartment.

19. The device according to claim 18, wherein the dome shaped part has a height less than one third of its diameter at the base, and wherein the dome shaped part has a diameter between 10 and 30 cm at the base and a height between 2 and 5 cm.

20. The device according to claim 15, wherein the dome shaped part is coupled with the spinning atomizer disk in order to rotate at the same speed, the spinning atomizer disk being positioned above the dome shaped part.

21. The device according to claim 15, wherein the substance supply for supplying a substance into the compartment comprises a separate supply channel for the water based liquid, a dosing device and a separate supply channel for a coating mix, wherein the spinning atomizer disk is provided in the compartment at a distance above the rotary bottom part, and wherein the separate supply channel is configured to let the water based liquid engage the spinning atomizer disk which then ejects the water based liquid outwardly.

22. The device according to claim 1, comprising at least one single, non-stick insert panel which is curved and extends over the entire inside of the stationary circumferential side wall which is contacted by the mixture of products and substance, thereby creating a single seam where two opposite ends of the insert panel meet one another in an abutting manner, wherein the at least one non-stick insert panel is manufactured from a single piece of sheet material which has a substantially rectangular form in a flat state, the single piece of sheet material having a cylindrical form in the installed state, the insert panel having a recess in one side of the rectangle, wherein the recess fits around a frame of a door of the device when the at least one non-stick insert panel is installed.

23. The device according to claim 1, wherein the scoop is connected to the stationary circumferential side wall and comprises a curved surface which extends substantially parallel to the stationary circumferential side wall and is curved in a first curve direction in order to direct a part of the rotating mixture of products and substance inward and is curved in a second curve direction in order to direct said part of the rotating mixture of products and substance downward at an upstream end of the scoop.

24. The device according to claim 23, wherein the total curvature is at least 50 degrees.

25. The device according to claim 1, wherein a separate supply channel for a coating mix is located directly above the scoop, wherein the portion of the mixture of products and substance which is redirected by the scoop meets the incoming stream of the coating mix, thereby efficiently mixing the coating mix with the products.

26. The device according to claim 1, wherein the products are nuts.

* * * * *